United States Patent Office 2,915,703
Patented Dec. 1, 1959

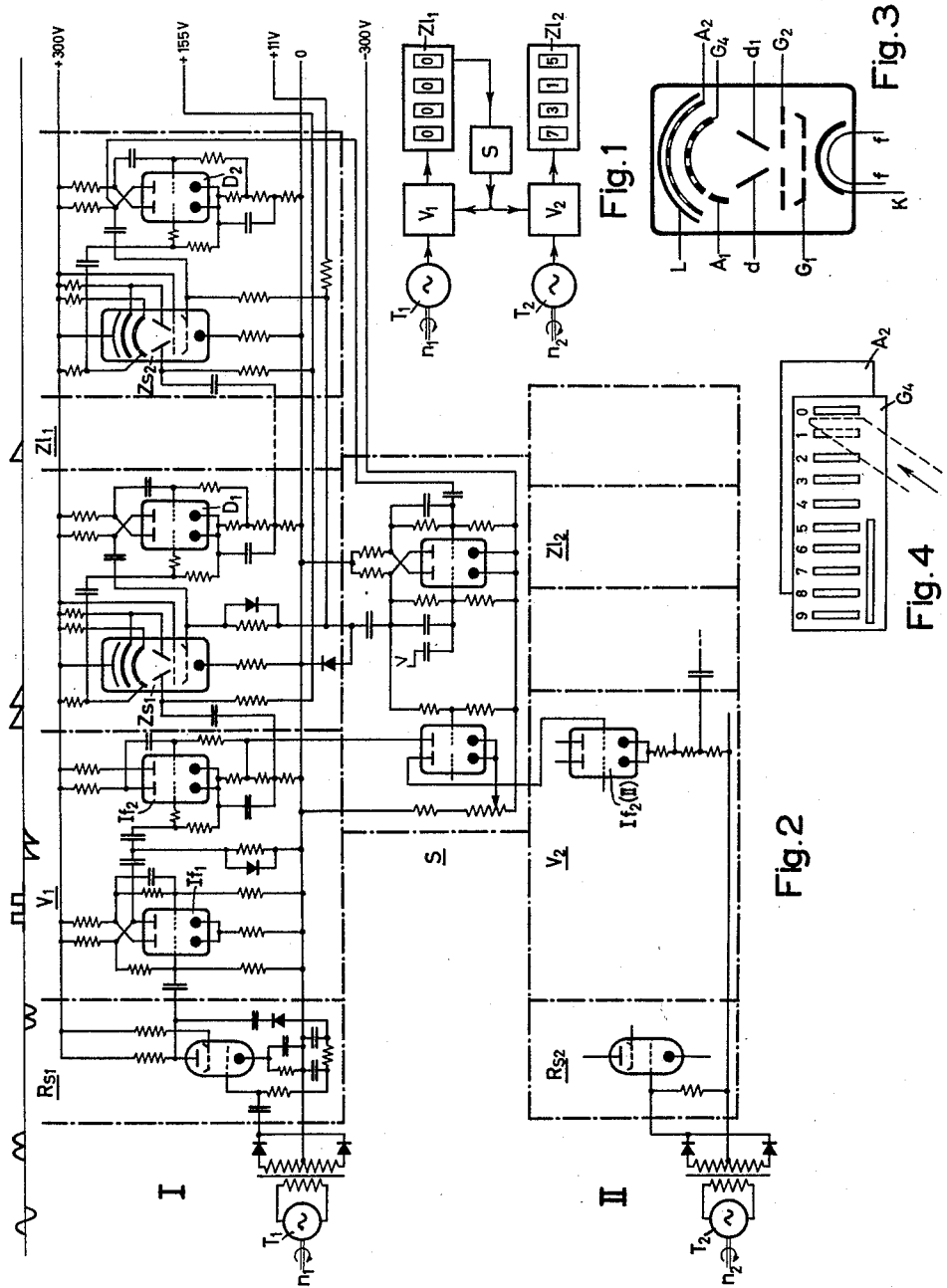

2,915,703

APPARATUS FOR MEASURING REVOLVING SPEED OR VELOCITY RATIOS

Gerhard Kessler, Erlangen, Germany, assignor to Siemens-Schuckertwerke Aktiengesellschaft, Berlin-Siemensstadt, Germany, a corporation of Germany Application March 24, 1955, Serial No. 496,536

Claims priority, application Germany March 25, 1954

7 Claims. (Cl. 324—69)

This invention is related to speed measuring devices and is directed particularly to apparatus for the direct reading measurement of the speed ratio of a pair of separately driven moving or revolving members which move at different velocities.

In many machines wherein two or more parts are driven by separate electric motors, it is important to hold the speeds of the motors as closely as possible to a given proportion. For example, in textile, paper and similar machines wherein the product being manufactured moves continuously, it is essential that the speed proportion or ratio of the rollers over which the product being produced travels, remains constant. In such machines and in similar devices, it is important to be able to measure the ratio of the speeds of revolution with great precision and independently of the actual speeds of revolution. For this purpose mechanical measuring apparatus operative to measure the speeds or velocities by measuring an amount of travel in a given unit of time have been used. The ratio of the velocities or speeds of revolution are derived by comparing the distance or angle through which the driven parts have moved during the same given unit of time. Such devices produce average values of the velocities over the measuring time intervals and are only as exact as the accuracy with which the respective movements and time intervals are measured. Thus, it will be apparent that with given absolute errors, accuracy is increased with an increase in length of the time intervals of measurement. These mechanical measuring devices, therefore, either require the use of long measuring intervals, or else require expensive precision machining to insure accuracy and dependability of measurement, especially at high speeds of revolution.

It is a principal object of the invention to improve measuring devices of the character described by transforming each of the angles of revolution or distances being measured into a proportional number of electrical impulses, and then counting the impulses by means of electrical counting devices. It is thereby possible to greatly decrease the measuring time interval while at the same time maintaining the desired high accuracy. No mechanical connecting elements subject to wear and tear are required, and speed proportion measurements at high velocities can readily be made.

The device according to the invention is especially advantageous in that it can be so constructed that as soon as the counter for the faster speed of revolution reaches a given round number, for example 100 or 1000, the counter responsive to the other speed of revolution being counted will be stopped. The second counter which has the lesser count will then indicate or print directly in decimal figures the numerical value of the ratio between the speeds being compared. Stopping or interrupting action on the second counter can be simply achieved in many cases by merely causing a blocking member to act upon the second counter as soon as the first counter reaches the predetermined "round figure" number of revolutions. The second counter will thereupon be unable to count subsequent impulses. By "round number" it will be understood that the number reached on the faster of the two counters may consist of all zeros such as "000" as in a three-digit counter, for example, where there is no fourth digit counting member available to register the "1" in 1,000. As a result, an all-zero count of "000" denotes the fact that an actual count of 1,000 has been registered. A similar situation will obviously prevail with respect to counting means employing flip-flop circuits as referred to below and wherein digital counting may be obtained in the first instance on a binary basis, with or without subsequent translation to a decimal system or scale of ten registration.

It is another object of the invention to increase the counting frequency of the derived impulses by multiplying with the use of suitable frequency multiplying circuits. Frequency doubling is readily achievable in the case of impulses of sinusoidal wave form by means of a simple rectifier circuit. For the reason that with a given measuring interval the accuracy falls off with a decrease in counting frequency, it is important to hold the counting frequency high. This can readily be accomplished by increasing the number of poles, reflection bands, shutter slits or contacts, as the case may be to increase the repetition rate of the pulses. If necessary the electrical impulses can readily be amplified and/or shaped to the desired wave form, for example as may be necessary in instances where the counting apparatus used requires an impulse having a leading edge of particular steepness.

The impulses are counted with the use of electric counting circuits wherein counting tubes operating on the decade system and operative to present a visible indication of the count are used. The term "electronic counting circuits" is to be understood to mean electrical circuits wherein the count is given for a certain, exact unit interval of time. Not only are circuits having electronic tubes applicable, but also circuits using semiconductors, such as transistors for example in flip-flop circuits, and similar circuits with which a count can be produced at extremely high velocities and without the use of mechanical parts.

Other objects and features of the invention will be apparent from the following description taken in conjunction with the accompanying drawings wherein:

Fig. 1 illustrates an embodiment of the invention in block diagram,

Fig. 2 illustrates a detailed electrical schematic diagram of the embodiment shown in Fig. 1, and Figs. 3 and 4 illustrate structural details of one of the counting tubes included in Fig. 2.

Considering now the detailed operation of the embodiment illustrated, Fig. 1 illustrates an arrangement according to the invention wherein two speeds of revolution $n_1$ and $n_2$ are to be compared with each other. The two moving parts, the speeds of revolution of which are to be compared, drive tachometer alternators $T_1$ and $T_2$ with speeds of revolutions $n_1$ and $n_2$, respectively. The impulses from the tachometer alternators $T_1$ and $T_2$ feed into respective input stages $V_1$ and $V_2$ of the electronic counting devices, the outputs of which are fed into the respective electronic indicating devices $Zl_1$ and $Zl_2$ of said devices. A blocking circuit S is connected with the counting device $Zl_1$ and operates upon both input stages $V_1$ and $V_2$ so that they can no longer transmit impulses as soon as the comparison count value, for example 10,000, is reached. The velocity ratio count can then be read directly from the indicating device $Zl_1$. In Fig. 1 the ratio of speeds $n_1$ to $n_2$ can thus be seen to be 0.7315. The blocking circuit S can be so designed that after a given length of time, sufficient to read the speed ratio measurement value, the counting devices are automatically reset to zero and released for a new counting operation cycle.

The series of electrical impulses from the tachometer alternator $T_1$ is multiplied and then fed into an input stage $R_{S1}$. In the circuit illustrated, the frequency of the impulses is doubled by use of a pair of rectifier elements in circuit with a center-tapped secondary of the input transformer. An input or buffer stage $R_{S1}$ is preferred in all cases, for the reason that it is important that the impulses always have the same amplitude regardless of whether the speed of the moving member being measured be fast or slow. The output of the input stage $R_{S1}$ is fed into a first shaping tube $I_{f1}$, which is a duo-triode connected as a one-shot multivibrator or switching circuit to produce an output wave-form of rectangular shape. The output of the first shaping tube $I_{f1}$ is fed into a second shaping stage comprising the duo-triode $I_{f2}$, wherein the impulses are transformed into saw-tooth wave-shapes having a rectilinear leading edge of suitable slope for operating the counting tubes. The various wave-forms are indicated above corresponding stages of the schematic diagram.

The counting portion $Z_1$ of the measuring circuit has individual stages $Z_{S1}$, $Z_{S2}$ etc. for each decade. The principle of construction of the counting tubes is illustrated in Figs. 3 and 4. Each tube as illustrated has a series of visible numbers, whereby, upon lighting up the corresponding slit beneath the numbers, the count being measured is indicated. These counting tubes can be connected to succeeding duo-triodes $D_1$ and $D_2$ so that from time to time they are actuated backwardly in an accelerated manner for resetting. Upon completion of the operating cycle of one of the decade tubes the succeeding decade tube is actuated.

The design of the second counting channel shown below the first channel is essentially the same. As soon as the decades of the upper channel are completely traversed, they excite the extinction and blocking stage S of which only one is provided. The stage S acts upon both channels and blocks the counting stages from receiving further impulses. As a result, the counting mechanism in the lower counting channel remains arrested at the value last indicated, so that in this manner the ratio of the two counting values is represented. The extinction and blocking stage again consists of two cooperating duo-triodes.

The operation of a counting tube, for instance according to Fig. 3, is as follows. The cathode K is heated by means of a filament $f$. The electrons emitted from the cathode are controlled by the grid $G_1$ and are accelerated by the grid $G_2$. They are then collected in the tube to form a strip-shaped beam of electrons which impinges upon a luminescent screen L. The voltage of the right-hand deflection plate $d_1$ causes the beam to be so directed that it impinges upon an arcuate element $G_4$ when a predetermined voltage value is reached. When the voltage at the anode $A_2$ and at the deflecting plate $d_1$ decreases relative to the voltage of deflecting plate $d$, the beam is deflected toward the left and passes through one of the slits in $G_4$ (Fig. 4) in the direction toward the anode $A_2$, thus causing the corresponding spot of the luminescent screen L to become illuminated. In this manner, by incrementally changing the anode voltage, the positions corresponding to all values of a decade are sequentially traversed.

The geometric arrangement and the electrical connection of the electrodes for the counting tubes are preferably so chosen that the position of the beam at the places determined by the slit are stable and that each arriving impulse lifts the beam into the next stable position corresponding to one digit value.

It is possible, as may be desirable in certain cases, to use the electrical counting circuits to energize electromechanical counters and thereby enable printing the measured ratio value so that it can be read at a later time. Also independent of a resetting arrangement as described above, the measurement count can be registered continuously or intermittently while maintaining the lengths of the corresponding successive time intervals fixed.

In accordance with the method of the invention comparisons of speeds of revolution by use of the integration method can be obtained in a short time and with great accuracy heretofore not obtainable. The device is also substantially independent of temperature variations and similar outside conditions. For this reason the apparatus lends itself well to the calibration and checking of quotient measuring apparatus in general. Because of its high operating velocity it is also possible to utilize the measured values for control purposes, for example in a device wherein a corrective control is effected upon deviation from a desired speed ratio to be maintained.

It is to be understood that the particular forms of the invention illustrated are shown for the purpose of illustration only, and that the invention is not to be limited to the specific disclosures, but may be modified and embodied in various other forms without departing from its spirit.

I claim:

1. Ratio measuring means for providing an instantaneous, directly readable indication of the speed ratio between respective velocities of two moving members at independent respective velocities, said moving members each having pulse producing means generating a separate series of pulses, the frequency of repetition of said respective pulses being proportional to said respective velocities of said members and coordinated to be equal to each other at equal values of said velocities, said ratio measuring means comprising two multiple-decade counters each decade of which consists of means including an individual decimal counting and decimal indicating electron tube, a first one of said counters being connected to one of said pulse-producing means for actuation by the faster moving one of said members, and a second one of said counters being connected to other pulse-producing means; blocking means connected to said first and second counters and responsive to the attainment of a zero count condition in said first counter reached upon the counting of $10^n$ pulses therein, where $n$ is the number of decades, for thereupon stopping pulses to both of said counters.

2. Ratio measuring means according to claim 1 wherein each of said counting and indicating tubes is provided with a luminous screen and electron beam-deflecting electrodes, and means for incrementally changing the deflection voltage between said deflecting electrodes in response to said pulses for incrementally deflecting the electron beam across said luminous screen.

3. Apparatus for measuring the relative speeds of a pair of moving members, comprising means responsive to the speeds of said members for generating two series of pulses having frequencies proportional to the respective speeds of said members; first and second decade counters each connected to one of said pulse generating means for receiving one of said series of pulses, each of said decade counters including a number of cathode-ray luminescent counting tubes, there being one counting tube for each decade counter, each counting tube having means for deflecting the cathode-ray in incremental steps in a given direction in response to said pulses, said tubes including means for producing an output pulse when a decade of pulses has been counted; means responsive to the output pulse from a given counting tube for resetting said tube to a zero count condition and supplying to the deflecting means of the next decade counting tube a pulse to be counted thereby; and means for blocking said second counter when the first counter reaches a predetermined count.

4. Apparatus according to claim 3, comprising means connected between each pulse generating means and one of the decade counters for equalizing amplitudes of the pulses at a given value.

5. Apparatus according to claim 3, wherein each counting tube includes a luminescent screen, an electrode positioned between the deflecting electrodes and said luminescent screen, said electrode having ten openings spaced in the direction of deflection of the electron beam for enabling the electrons to strike the luminescent screen at ten positions marked by decimal numbers.

6. Apparatus according to claim 3, wherein the blocking means includes means for blocking the second counter when the first counter reaches a count equal to a given power of ten.

7. Apparatus according to claim 6, including means operative at a predetermined interval after operation of said blocking means to reset each of said counters to zero and release said counters for the next cycle of operation.

References Cited in the file of this patent

UNITED STATES PATENTS

| | | |
|---|---|---|
| 2,516,189 | Dinsmore | July 25, 1950 |
| 2,769,306 | Harris | Nov. 6, 1956 |